(12) United States Patent
Huggahalli et al.

(10) Patent No.: US 12,236,128 B2
(45) Date of Patent: Feb. 25, 2025

(54) PARTIAL MEMORY UPDATES USING PRESET TEMPLATES

(71) Applicant: Microsoft Technology Licensing, LLC, Redmond, WA (US)

(72) Inventors: Ramakrishna Huggahalli, Scottsdale, AZ (US); Shachar Raindel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 17/706,088

(22) Filed: Mar. 28, 2022

(65) Prior Publication Data

US 2023/0305739 A1    Sep. 28, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0604; G06F 3/0655; G06F 3/0679; G06F 12/04; G06F 12/0886; G06F 2212/1024
See application file for complete search history.

(56) References Cited

U.S. PATENT DOCUMENTS

| | | | |
|---|---|---|---|
| 2005/0015549 A1 | 1/2005 | Dierks et al. | |
| 2016/0006673 A1 | 1/2016 | Thomas et al. | |
| 2016/0055093 A1 | 2/2016 | Turner et al. | |
| 2018/0060035 A1* | 3/2018 | Simmons | G06F 7/02 |
| 2019/0035437 A1 | 1/2019 | Zimmerman et al. | |
| 2020/0104072 A1* | 4/2020 | Ngu | G06F 3/0604 |
| 2021/0157527 A1* | 5/2021 | Kim | G06F 3/0613 |
| 2023/0013270 A1* | 1/2023 | Chachad | G06F 3/0685 |
| 2023/0064619 A1* | 3/2023 | Lim | G06F 12/0238 |

FOREIGN PATENT DOCUMENTS

EP    2894568 A1    7/2015

OTHER PUBLICATIONS

"International Search Report and Written Opinion Issued in PCT Application No. PCT/US22/054018.", Mailed Date: Apr. 28, 2023, 12 Pages.

* cited by examiner

*Primary Examiner* — Jane W Benner
(74) *Attorney, Agent, or Firm* — Holzer Patel Drennan (57) ABSTRACT

Embodiments of the present disclosure includes techniques for partial memory updates in a computer system. A data structure template is received. A first write data of a first write operation is received from a first data source, the first write operation performed in connection with provisioning of a first data payload to memory communicatively coupled with a processing unit. A first merge operation is performed involving the first write data and the first data structure template to obtain a first data structure update. The first data structure update is written to the memory, thereby improving efficiency of updating a first data structure associated with the first data payload.

22 Claims, 8 Drawing Sheets

PARTIAL MEMORY UPDATES USING PRESET TEMPLATES

BACKGROUND

The present disclosure relates to a computing system. More particularly, the present disclosure relates to techniques for data transactions with memory of a computer system.

Input/Output (IO) devices enable users and external systems to interface with a computer system. IO devices can provide updates indicating the presence of new data to be processed by the computer system. In connection with storing a payload of the new data to memory buffers that are visible to entities that use the memory buffers, hardware structures and protocols are used to read old data and merge the new data with the old data. A procedure involving a combination of read and write operations is performed to appropriately process and store the data structure and the new data. The procedure is inefficient, consumes valuable bandwidth on system interfaces, and can cause significant latency between write operations performed by different entities as part of the procedure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Embodiments herein relate to techniques for writing updates to memory in connection with the provisioning of new data by a data source, such as an IO device, to be processed or stored on a computer system. Features disclosed herein reduce the number of operations that are performed for a memory update, and reduce latency between operations, and reduce interface bandwidth usage. One or more embodiments herein disclose implementation of a template in an intermediate device between a data source and a target of data provided by the data source. One or more logic operations are performed to merge a set of data with the template, thereby adjusting a size and/or a layout of the set of data. A result of the one or more logic operations is then stored to the target of the data using a single write operation rather than a sequence of data reads and writes.

Figure 1:
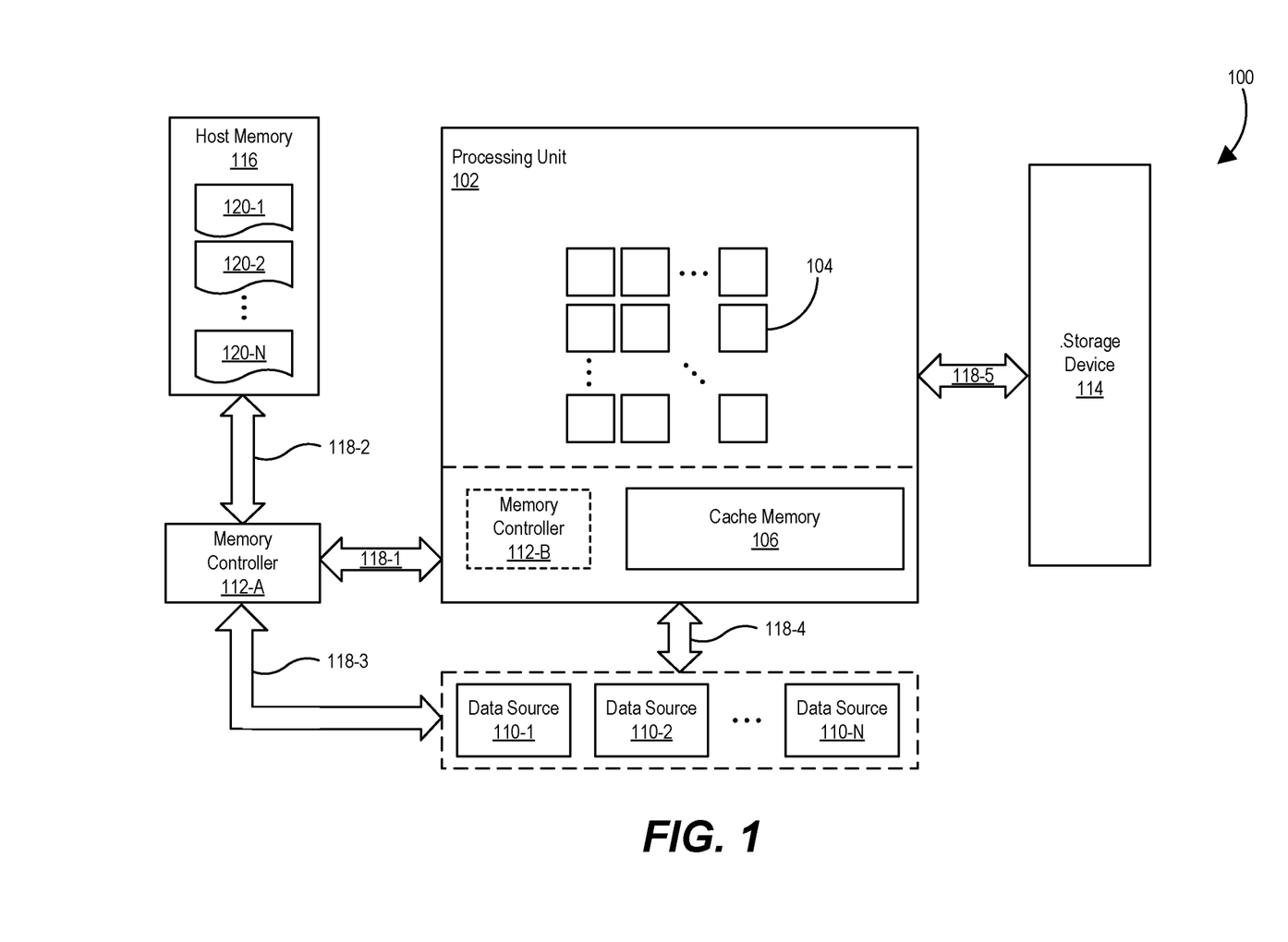
FIG. 1 illustrates an example computer system according to one or more embodiments.

FIG. 1 illustrates a computer system 100 according to one or more embodiments. The computer system 100 comprises a processing unit 102 that includes a set of processor cores 104, and cache memory 106. In some embodiments, the processing unit 102 may be a system-on-chip or a system-on-package that includes additional components not shown. Individual cores of the set of processor cores 104 are configured to process data independently of other cores of the set of processor cores 104. The cache memory 106 stores data processed by or to be processed by one or more of the processor cores 104. The processor cores 104 are each an individual processing element or compute engine that process data or coordinate the processing of data on behalf of the processing unit 102 as a whole. The processor cores 104 may be homogenous or heterogenous. For instance, the processor cores 104 may include processor cores of different sizes or processing power, or may be programmable, have a fixed set of functions, or a hybrid of programmable and fixed-function cores.

The computer system 100 further comprises one or more data sources 110-1, 110-2, . . . 110-N (collectively "data sources 110"), a memory controller 112, storage device 114, and host memory 116. The data sources 110 provide data to be processed by the processing unit 102 and/or stored to memory, such as the storage device 114 or the host memory 116. The memory controller 112 sends and receives data, e.g., in control signals, for controlling write operations and read operations involving the data sources 110, the host memory 116, and/or the processing unit 102. In some embodiments, the memory controller 112 includes a memory controller 112-A separate from the processing unit 102. In some embodiments, the memory controller 112 includes a memory controller 112-B that is on the processing unit 102 (e.g., an integrated memory controller).

The one or more data sources 110 may include a network interface controller (NIC), input devices (e.g., mouse, keyboard), ports, and/or peripheral devices, by way of non-limiting example. The storage device 114 includes one or more types of non-volatile (e.g., read-only) memory, such as solid-state memory, a hard disk drive, electrically erasable programmable read-only memory, and flash memory, by way of non-limiting example. The host memory 116 is a region of random-access or volatile memory that is accessible by and visible primarily to the processing unit 102.

The computer system 100 includes a plurality of interfaces 118 through which data is exchanged. The computer system 100, more particularly, includes an interface 118-1 between the processing unit 102 and the memory controller 112-A; an interface 118-2 between the memory controller 112-A and the host memory 116; one or more interfaces 118-3 between the data sources 110 and the memory controller 112-A; one or more interfaces 118-4 between the processing unit 102 and the data sources 110; and an interface 118-5 between the processing unit 102 and the storage device 114. The interfaces 118-4 and 118-5 may include various types of buses, such as peripheral component interconnect (PCI) buses, personal computer memory card international association (PCMCIA) buses, universal serial buses (USBs), and PCI express (PCIe) buses, as non-limiting examples.

In the computer system 100, one or more payloads 120-1, 120-2, . . . 120-N of data may be transported via one or more of the interfaces 118 and stored in the host memory 116. As an example, the data source 110-1 may be an NIC and the payload 120-1 may be a payload of a network data packet received over one or more networks via the NIC. A write operation may be performed in which the payload 120-1 is transmitted over one or more of the interfaces 118 and stored on the host memory 116. In connection with storage of the payload 120-1, a series of data transactions are performed in which the memory controller 112 stores data associated with the payload 120-1 to the host memory 116.

Figure 2:
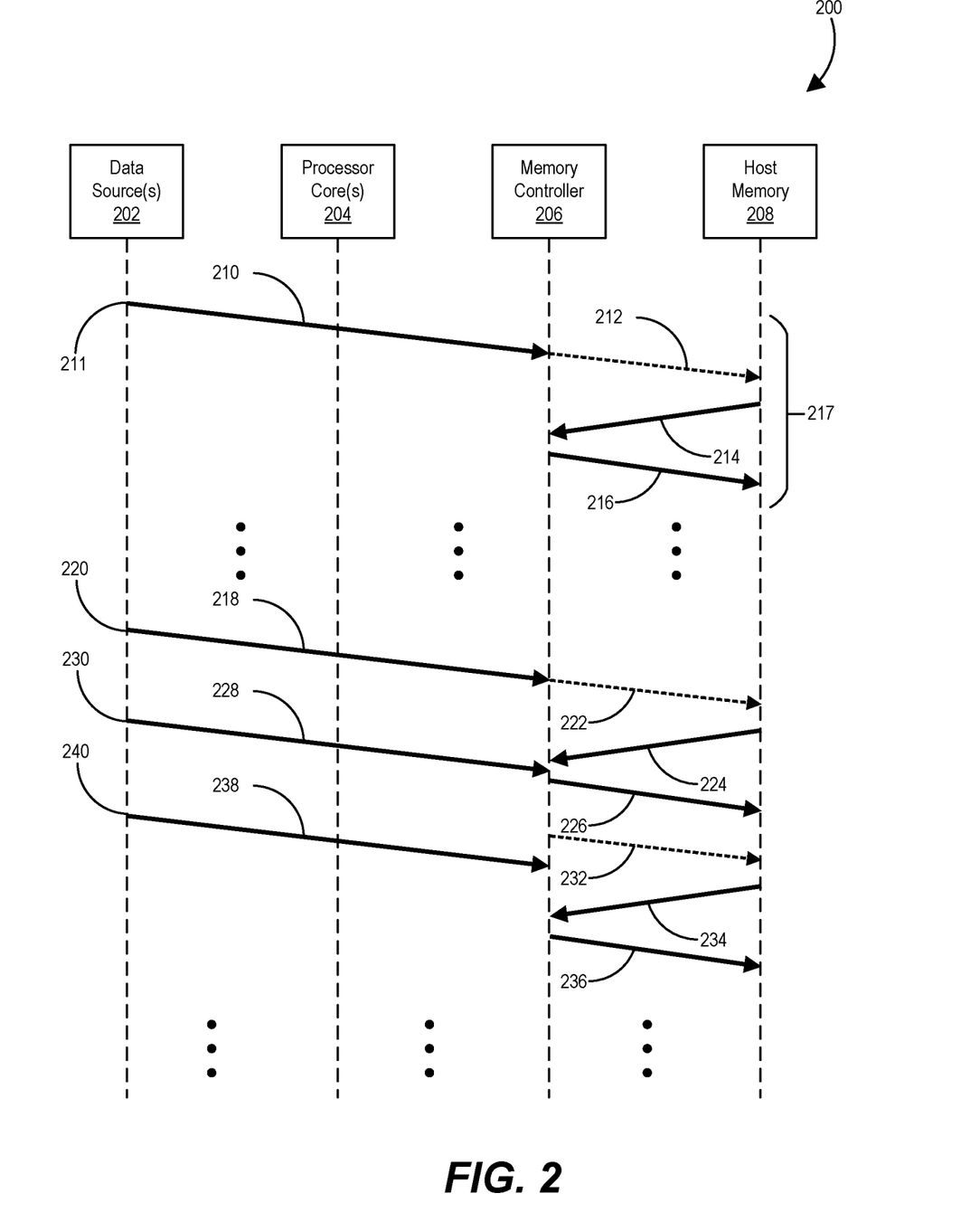
FIG. 2 illustrates a first example data flow diagram in which a series of data transactions are performed in connection with storage of a data payload according to one or more embodiments.

FIG. 2 illustrates a first example data flow diagram 200 in which a series of data transactions are performed in connection with storage of a data payload according to one or more embodiments. Various features described with respect to the flow diagram 200 are similar to features described with respect to FIG. 1, so further description thereof is omitted for brevity. The flow diagram 200 includes data transactions involving one or more data sources 202, one or more processor cores 204, a memory controller 206, and host memory 208. The phrase "data transactions," as used herein, refers to operations in which data is read or written from one device to another device in the computer system 100.

The flow diagram 200 represents a complementary process to a data transaction in which a payload of data, such as the payload 120-1, is transferred from one device to another. For instance, the data source 202 may be a NIC and a payload portion of a data packet may be processed by the processing unit 102, e.g., for compression, encryption. The NIC performs a write operation in which the payload portion of the data packet (e.g., payload 120-1) is written to memory buffers via the memory controller 112. As a result of or in connection with the write operation, a separate data structure is updated to indicate information regarding the data to be read and processed by devices of the computer system 100. For the foregoing example wherein the data source 202 is an NIC, the payload portion of the data packet may be read for transmission and the data structure may be provided separately, e.g., after performing or attempting the transmission process for the payload portion. The data structure may, for example, provide a status indicating whether transmission of the payload portion was successful.

Referring to FIG. 2, in connection with a procedure in which an attempt to transfer a data payload from the data source 202 to the host memory 208, the data source 202 performs a write operation 210 in which an amount of data is written to the memory controller 206. The write operation 210, for instance, may involve writing an 8-byte portion of data from the data source 202 to the memory controller 206. The write operation 210 may be performed at a time 211 subsequent to a time at which storage of a payload of data was initiated.

As a result of the write operation 210, the memory controller 206 issues a read request 212 to the host memory 208. The read request 212 is, in some embodiments, a request by the memory controller 206 to read a portion of data stored in the host memory 208. The read request 212 may specify an amount of data to be read and/or an identifier for the data to be read. The identifier for the data to be read may include a memory address of the data, such as a row and/or a column in a memory array of the host memory 208.

In response to the read request 212, a read data operation 214 is performed in which the requested data is read by the memory controller 206 from the host memory 208. The amount of data read in the read data operation 214 is an amount of data larger than the write operation 210. For instance, the memory controller 206 may read a 64-byte portion of data from the host memory 208. In some embodiments, the read data operation 214 involves reading a message associated with the payload of the data provided by the data source 202. The message may include a set of bytes corresponding to a fixed header associated with the payload, a set of bytes corresponding to an error message associated with the payload transfer, and a set of bytes corresponding to a status of the payload transfer.

The memory controller 206 compares first data obtained in the write operation 210 with second data obtained in the read data operation 214. As a result of the comparison, the memory controller 206 updates the second data based on the first data and performs a write operation 216 in which the updated second data is written back to the host memory 208. The updated second data written in the write operation 216 may be the same size as the data read in the read data operation 214. For example, the write operation 216 may involve writing 64-bytes of data to the host memory 208. The size of the write operation 216, in some embodiments, corresponds to a size of a line of cache memory of the memory controller 206.

Performance of the write operation 210, the read request 212, the read data operation 214, and the write operation 216 may collectively be considered as performing a first update process 217 to a data structure associated with the payload 120-1 in the host memory 208. There are several deficiencies associated with the first update process 217. The number of operations involved in the first update process 217 to the host memory 208 is inefficient. The process of the first update process 217 involves a significant inflation of bandwidth. For a write operation 210 of eight bytes, for example, the amount of total bandwidth utilized for the read data operation 214 and the write operation 216 is 128 bytes—an inflation of 16 times the initial bandwidth usage of the write operation 210.

The process of the first update process 217 in connection with storage of a payload introduces latency. Consider, for instance, a write operation 218 performed at a first time 220, the write operation 218 corresponding to the write operation 210. A read request 222, a read operation 224, and a write operation 226 are sequentially performed as described with respect to the read request 212, the read data operation 214, and the write operation 216. A second write operation 228 may be initiated at a second time 230 prior to completion of the write operation 226. The memory controller 206 registers the write operation 228 and completes performance of the write operation 226. The memory controller 206 then performs, in response to the write operation 230, a read request 232, a read operation 234, and a write operation 236. In the interim, the memory controller 206 receives a third write operation 238 at a third time 240 before performance of the read operation 234. There is therefore a delay between a current sequence of operations being performed and a time at which a write operation is received to initiate the current sequence. This latency may continue to grow as additional write operations are received from a data source, utilizing valuable computational resources and interface bandwidth of the memory controller 206.

Figure 3:
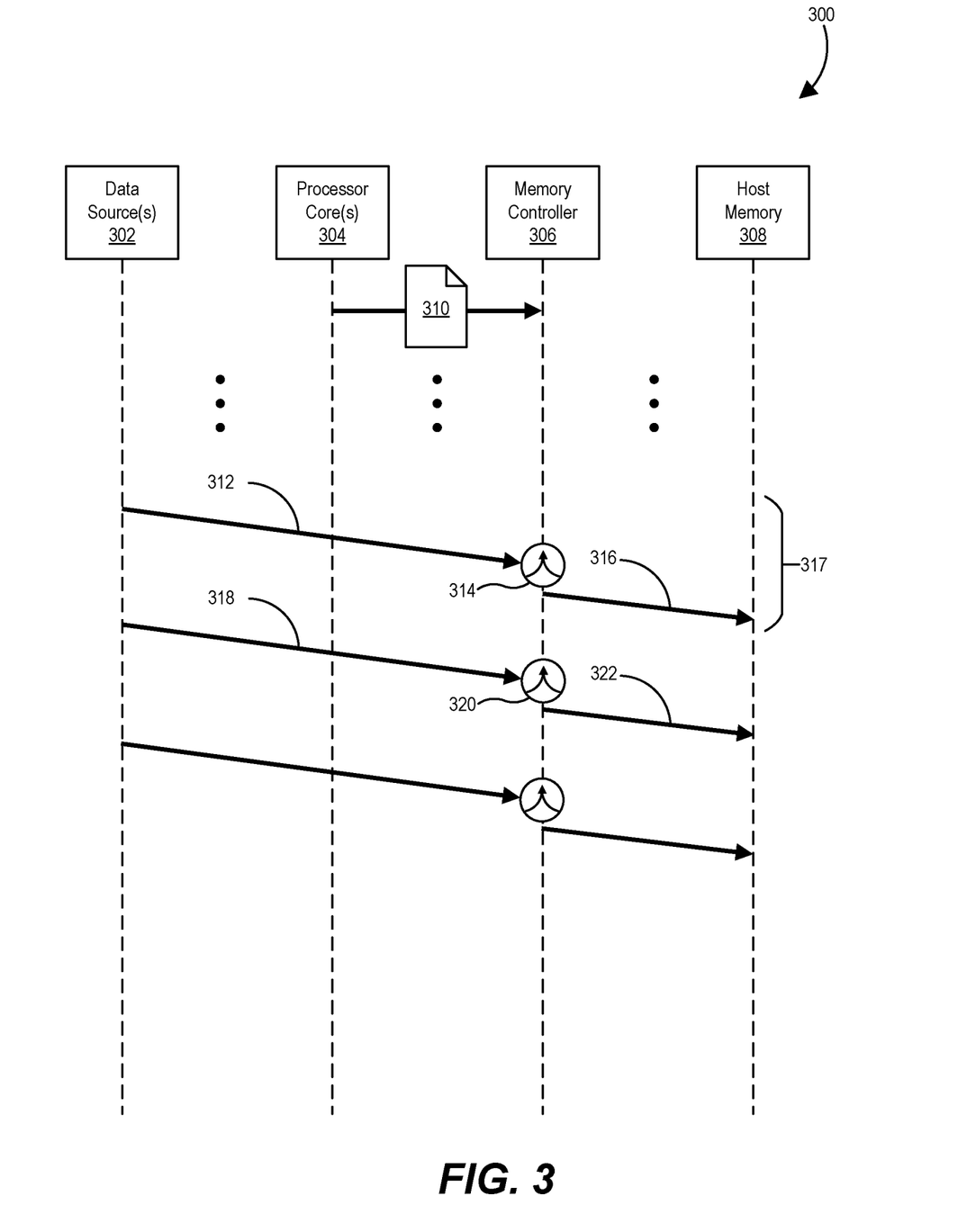
FIG. 3 illustrates a second example data flow diagram in which a series of data transactions are performed in connection with storage of a data payload according to one or more embodiments.

FIG. 3 illustrates a second example data flow diagram 300 in which a series of data transactions are performed in connection with storage of a data payload according to one or more embodiments. Various features described with respect to the flow diagram 300 are similar to features described with respect to FIG. 1, so further description thereof is omitted for brevity. The flow diagram 300 includes data transactions involving one or more data sources 302, one or more processor cores 304, a memory controller 306, and host memory 308.

The processor core 304 performs a write operation in which a template 310 is written to memory of the memory controller 306. The template 310 is a data structure in which individual bytes of the template 310 are set to defined value. The template 310 has a size corresponding to a size of data involved in write operations performed as a result of receiving, by the memory controller 306, a write operation from the data source 302. For instance, the size of the template 310 may be equivalent to a size of the write operation 216 performed as a result of the memory controller 206 receiving the write operation 210. More particularly, the template 310 may be 64 bytes in length. In some embodiments, the processor core(s) 304 may send a plurality of templates 310 for a single data source 302. Each of the plurality of templates may correspond to a particular data type, data format, or data size of data to be written from the data source 302.

In some embodiments, one or more devices other than the processor core 304 may provide the template 310 to the memory controller 306. By way of non-limiting example, the template 310 may be sent by an interconnect system controller or switching device (e.g., PCI controller, PCIe controller, PCIe root complex), by a storage device (e.g., flash memory device), or by another hardware device communicatively coupled to the memory controller 306. In some embodiments, the one or more devices other than the processor core 304 may be hard-coded to send the template 310 (e.g., at run-time, at design-time) or may be configured to read/obtain the template 310 from data storage—for example, from a defined location of a storage device.

In some embodiments, the template 310 may be generated by an authorized user, such as a technician or engineer, installing software or firmware to the processing unit 102. In some embodiments, the template 310 may be installed on the processing unit 102 as a result of an update to the computer system 100, such as an update to software, firmware, or an operating system of the computer system 100. The template 310 may be specific to the type, generation, model, etc., of the data source 302. The template 310, for example, may have a size and/or a format (e.g., bit values) specific to an NIC, a video camera, or a USB memory storage device.

In some embodiments, one or more devices other than the memory controller 306 may receive and the template 310 and perform a merge operation, as described herein. For instance, one or more interconnect system controllers or switching devices (e.g., PCI controller, PCIe controller, PCIe root complex) may be configured to receive templates and/or perform merge operations using the template received. In some embodiments, the memory controller 306 may be a cache memory controller.

Subsequent to provisioning of the template 310 to the memory controller 306, the data source 302 performs a write operation 312 to the memory controller 306. The write operation 312 is performed in connection with a procedure in which an attempt to transfer a data payload from the data source 302 to the host memory 308, as described with respect to FIGS. 1 and 2. The write operation 312 may include an amount of data smaller in size than the template 310. The template 310 may have a size of 64 bytes of data whereas the write operation 312 may have a size of 8 bytes of data.

The memory controller 306 performs a merge operation 314 in which the data in the write operation 312 and the data in the template 310 are merged together. The merge operation 314 may include one or more logical operations involving the template 310 and the data written in the write operation 312. For instance, one or more logical operations may be performed using the data written in the write operation 312 and a first set of bytes of the template 310. The logical operations performed may include Boolean operations such as an AND operation or an OR operation. The merge operation 314 expands the data received in the write operation 312 to a larger size, such as the size of a full line of cache memory of the memory controller 306.

The memory controller 306 performs a write operation 316 in which a result of the merge operation 314 is written to the host memory 308. The sequence of operations comprising the write operation 312, the merge operation 314, and the write operation 316 may be considered as a second update 317 to a data structure in the host memory 308, the data structure associated with provisioning of a payload of data from the data source 302 to the host memory 308. The second update process 317 provides several benefits over the sequence of operations 210, 212, 214, and 216 described with respect to FIG. 2. The second update process 317 involves fewer total operations and does not involve read operations or read requests between the memory controller 306 and the host memory 308.

The second update process 317 reduces bandwidth inflation relative to the first update process 217. The read request 212 itself may occupy at least the same amount of interface bandwidth as the write operation 210 (e.g., 8 bytes) whereas the read data operation 214 and the write operation 216 each involve eight times the amount of interface bandwidth (e.g., 64 bytes each) as the write operation 210. By contrast, the merge operation 314 does not occupy any read bandwidth on an interface between the memory controller 306 and the host memory 308, achieving a significant reduction in bandwidth usage.

The second update process 317 also reduces latency relative to the first update process 217. More particularly, the amount of time involved in performing the merge operation 314 is less than the amount of time involved in performing the read request 212 and the read data operation 214 of the first update process 217. The memory controller 306 can therefore complete the second update process 317 more quickly than the first update process 217. In response to initiation of a write operation 318 after the write operation 312, the memory controller 306 can perform a merge operation 320 and a subsequent write operation 322 to the host memory 308 without delay. In the first update process 217, there is a delay between a time at which the memory controller 206 receives the write operation 228 and a time at which the read request 232 and subsequent read operation 234 are performed.

A size of the data received from the data source(s) 302 in the write operation 318 is the same as the size of the data received from the data source(s) 302 in the write operation 312. Performance of the merge operation 320 may increase the size of the data received in the write operation 318 to the same size as the template 310. In some embodiments, the data written in the write operation 322 has the same size as the data written in the write operation 316—for example, 64 bytes. In some embodiments, the size of the data written in each of the write operations 316 and 322 is the same as the size of the template 310.

Figure 4:
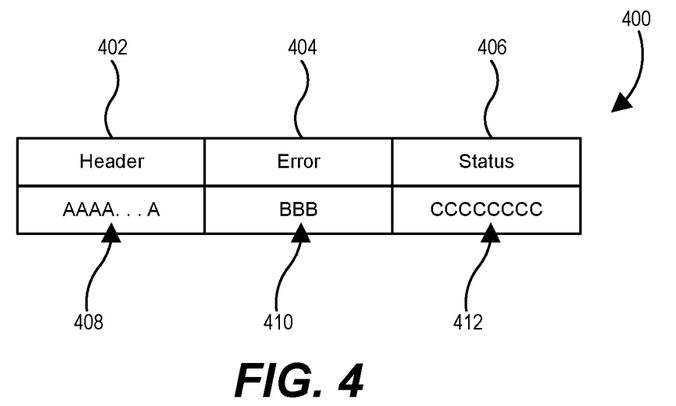
FIG. 4 illustrates an example data structure that is updated in host memory of the computer system of FIG. 1 according to one or more embodiments

FIG. 4 illustrates a data structure 400 that is updated in host memory of the computer system 100 according to one or more embodiments. The data structure 400 is associated with transfer of a data payload, such as the payload 120-1, from one of the data sources 110 to the host memory 116 in FIG. 1. The data structure 400 includes a first segment 402, a second segment 404, and a third segment 406. The first segment 402 comprises a first set of bytes 408, the second segment 404 comprises a second set of bytes 410, and the third segment 406 comprises a third set of bytes 412.

As a non-limiting example, the data source 110 may be an NIC providing a network data packet as the payload 120-1. In this example, the first segment 402 may be a header of the data packet, the second segment 404 may be indicate error(s) associated with the data packet, and the third segment 406 may be a status associated with the data packet or the transfer/storage of the data packet. The data structure 400 associated with the data packet may be greater than eight bytes in length—for instance, the data structure 400 may be 64 bytes in length. The first set of bytes 408 may be 28 bytes in length, the second set of bytes 410 may be three (3) bytes in length, and the third set of bytes 412 may be eight (8) bytes in length. A single write operation initiated by the data source 302 to the memory controller 306 may include the data for the third segment 406, but not data for the first segment 402 or the second segment 404.

Figure 5A:
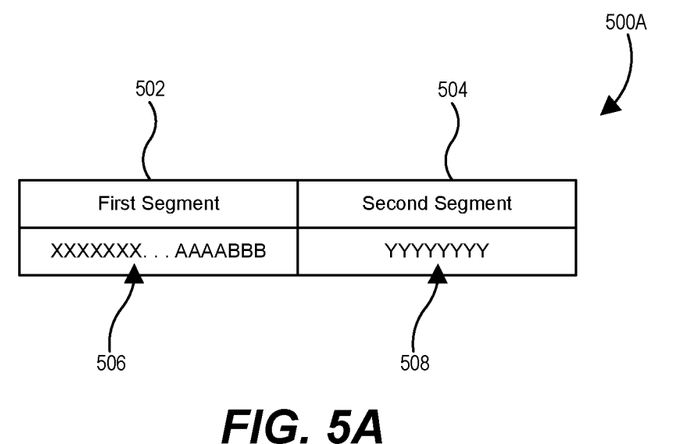
FIG. 5A illustrates a first template implemented by the computer system of FIG. 1 according to one or more embodiments.

FIG. 5A shows a first template 500A implemented by the computer system 100 according to one or more embodiments. The first template 500A may be provided by the processor core 304 to the memory controller 306, as described with respect to FIG. 3. The first template 500A includes a first segment 502 and a second segment 504. The first segment 502 includes a first set of template bytes 506 and the second segment 504 includes a second set of template bytes 508. The size of the first segment 502 may be different than the size of the second segment 504. For instance, the first set of template bytes 506 may be 56 bytes in length whereas the second set of template bytes 508 may be eight (8) bytes in length.

The structure of the first template 500A corresponds, in part, to the data structure 400. The first set of template bytes 506 may include a first set of bytes "XXXX . . . X," a second set of fixed bytes "AAAA," and a third set of bytes "B." The first set of bytes "XXXX . . . X" may be bytes of the same value (e.g., zeros). The second set of bytes "AAAA" may be bytes having different values that correspond to the first set of bytes 408. The third set of bytes "B" may be bytes having different values corresponding to the second set of bytes 410. The second set of template bytes 508 of the second segment 504 has values corresponding to the third set of bytes 412.

For subsequent transfer or storage operations of the payload 120-1 to the host memory 116, certain portions of the data structure 400 may remain constant for most operations whereas other portions of the data structure 400 may change more frequently. As one non-limiting example, the first set of bytes 408 and the second set of bytes 410 of the data structure 400 may be the same for different transfer/storage operations of the payload 120-1 whereas the third set of bytes 412 may change between different transfer/storage operations of the payload 120-1. Accordingly, the first set of template bytes 506 may be static or fixed bytes that include the bytes "AAA . . . ABBB" of the first and second set of bytes 408 and 410. The second set of template bytes 508 may be a same value Y—for example, all zeros.

Figure 6A:
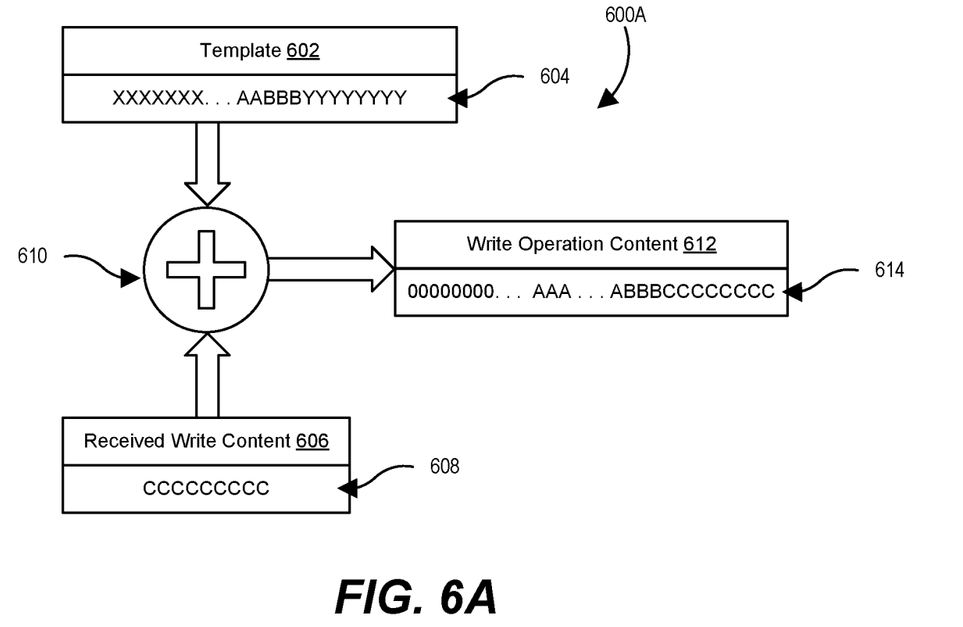
FIG. 6A illustrates a first merge operation performed by a merge point of the computer system of FIG. 1 according to one or more embodiments.

FIG. 6A shows a merge operation 600A performed by a merge point of the computer system 100 according to one or more embodiments. The merge operation 600A may be performed by the memory controller 306 or any other entity in the computer system 100 in which data structures, such as the data structure 400, are updated in connection with storage and/or transfer of data payloads. The merge operation 600A involves a template 602 provided by the processor core 304 to the merge point. The template 602 corresponds to the template 500A described with respect to FIG. 5A and elsewhere herein. The template 602 includes a set of bytes 604 that includes a segment having values "AAAAB," described with respect to FIG. 5A.

At least some of the remainder of the set of bytes 604 include predetermined values based on one or more logical operation to be performed by the memory controller 306 in the merge operation 600A. For instance, the set of bytes 604 includes a string of bytes "YYY" that may be all ones (1) or that may be all zeros (0). The set of bytes 604 also includes a string of bytes "XXXXXXX" that may be all ones or that may be all zeros. The string of bytes "XXXXXXX" may be the same as or different than the string of bytes "YYY."

The merge operation 600A also involves write content 606 received from a data source, such as the data source 302. The write content 606 includes a set of bytes 608 represented by values "CCCCCCCC," where each value "C" is a byte of data. The write content 606 may, for instance, correspond to status bytes associated with the storage or transfer of the payload 120-1 to the host memory 116. Individual bytes or collections of bytes of the set of bytes 608 may correspond to statuses indicating, e.g., a size of the data packet or data packets transferred in the payload 120-1, an address or address range of the data packets in the host memory 116. The write content 606 may be considered as being metadata in some contexts.

The merge operation 600A involves performing a set of logical operations 610 using the template 602 and the received write content 606 as operands. The set of logical operations 610 may include an AND operation, an OR operation, an XNOR operation, an XOR operation, a NAND operation, a shift operation, a NOT operation, or other logical operations. As a particular non-limiting example, the "X" and "Y" values in the set of bytes 604 may be zeros whereas the "A" and "B" values in the set of bytes may correspond to the static values for the data structure 400 to be updated in the host memory 308.

As a result of performing the set of logical operations 610, the memory controller 306 generates write operation content 612 based on the received write content 606. The write operation content 612, for instance, includes a set of bytes 614 that include the bytes "AAA . . . ABBB" that are typically the same for different write operations from the same data source 302. The write operation content 612 also includes bytes "CCCCCCCC" that match the values of bytes in the received write content 606. Performing the set of logical operations 610 using the template 602 and the received write content 606 expands the size of the received write content 606 to a larger defined size. The received write content 606 may be 8 bytes in size whereas the write operation content 612 may be 64 bytes in size. In some embodiments, the size of the write operation content 612 corresponds to a full line of cache memory of the memory controller 306.

In some embodiments, the set of logical operations 610 may involve a combination of logical operations. For instance, a NOT logical operation may be initially performed on the received write content 606 to obtain an intermediate result. Then, an XOR logical operation may then be performed using the intermediate result and the template 602 as operands to obtain the write operation content 612. A variety of sequences of logical operations may be performed based on various attributes of the template 602, the data structure 400, attributes of the memory controller 306, and/or attributes of the data source.

In some embodiments, different parts of the data structure 400 may be updated in connection with the transfer or storage of the payload 120-1 to the host memory 116. For example, a set of least significant bytes of the first segment 402 may change in addition to the set of bytes 412 of the third segment 406. In such cases, the template may include more than two segments.

Figure 5B:
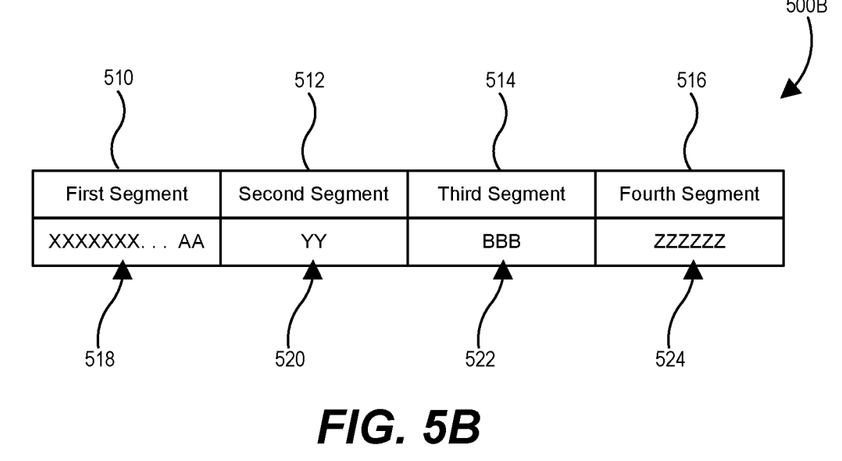
FIG. 5B illustrates a second template implemented by the computer system of FIG. 1 according to one or more embodiments.

FIG. 5B shows a second template 500B implemented by the computer system 100 according to one or more embodiments. The second template 500B may be provided by the processor core 304 to the memory controller 306, as described with respect to FIG. 3. The second template 500B includes a first segment 510, a second segment 512, a third segment 514, and a fourth segment 516. The first segment 502 includes a first set of template bytes 518 that include the fixed or static bytes of the first set of bytes 408. The second segment 512 includes and a second set of template bytes 520 that correspond to the set of least significant bytes of the first segment 402 that may change in different data structure updates. The third segment 514 includes a third set of template bytes 522 that correspond to the second set of bytes 410 of the second segment 404 of the data structure 400. Finally, the fourth segment 516 includes a fourth set of template bytes 524 that correspond to the second set of template bytes 508 described with respect to FIG. 5A. In a merge operation, the memory controller 306 may update bytes of data corresponding to the second segment 512 and the fourth segment 516 without changing the remaining bytes.

Figure 6B:
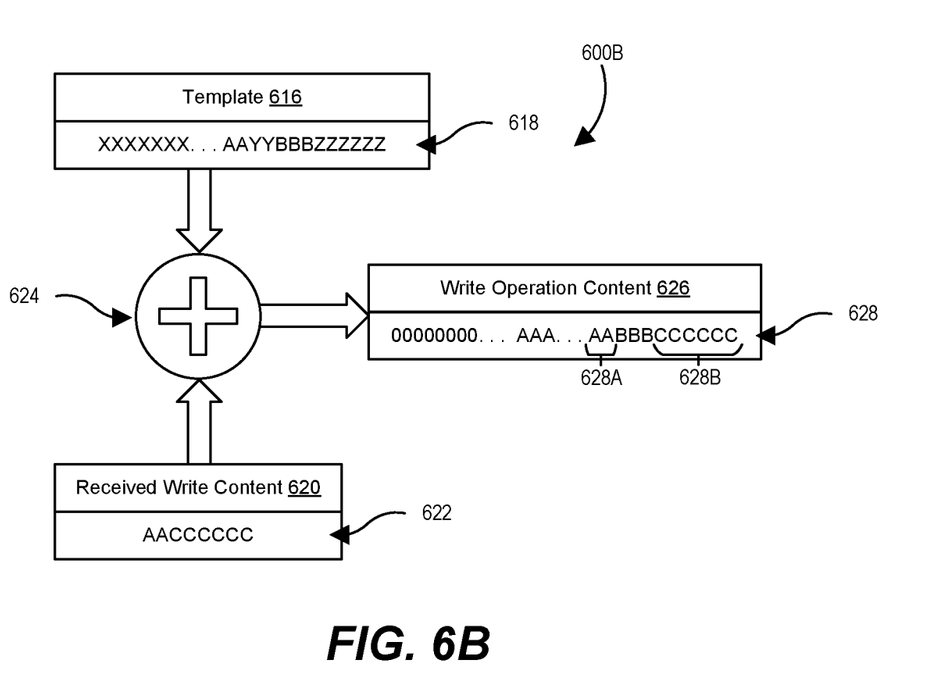
FIG. 6B illustrates a second merge operation performed by a merge point of the computer system of FIG. 1 according to one or more embodiments.

FIG. 6B shows a merge operation 600B performed by a merge point of the computer system 100 according to one or more embodiments. The merge operation 600B may be performed by the memory controller 306 or any other entity in the computer system 100 in which data structures, such as the data structure 400, are updated in connection with storage and/or transfer of data payloads. The merge operation 600B involves a template 616 provided by the processor core 304 to the merge point. The template 616 corresponds to the template 500B described with respect to FIG. 5B and elsewhere herein. The template 616 includes a set of bytes 618 that includes one segment "YY" and another segment "ZZZZZZ," which correspond to portions of the data structure 400 that may change in different write operations.

The merge operation 600B also involves write content 620 received from a data source, such as the data source 302. The write content 620 includes a set of bytes 622 represented by values "AACCCCCC," wherein the portion "AA" corresponds to a set of bytes of the first segment 402 of the data structure 400 and the portion "CCCCCC" corresponds to a set of bytes of the third segment 406 of the data structure 400. The write content 606 may correspond to header bytes and status bytes associated with the storage or transfer of the payload 120-1 to the host memory 116. For instance, the portion "AA" may be least significant bytes of a header and the portion "CCCCCC" may be least significant bytes of a status.

As described with respect to FIG. 6A, the merge operation 600B involves performing a set of logical operations 624 using the template 616 and the received write content 620 as operands. The set of logical operations 624 correspond to those described with respect to FIG. 6A, so further description thereof is omitted for brevity. As a result of performing the set of logical operations 624, the memory controller 306 generates write operation content 626 based on the received write content 620. A set of bytes 628 of the write operation content 626 includes a first portion 628A and a second portion 628B corresponding to portions of the data structure 400 that may change for different write operations from the same data source 302. The write operation content 612 also includes bytes "CCCCCCCCC" that match the values of bytes in the received write content 606. As shown, the first portion 628A is separated from the second portion 628B by one or more bits or bytes. The received write content 620 may be 8 bytes in size whereas the write operation content 626 may be 64 bytes in size. The memory controller 308 performs a write operation, such as the write operation 316, to write the write operation content 626 to the host memory 308.

Figure 7:
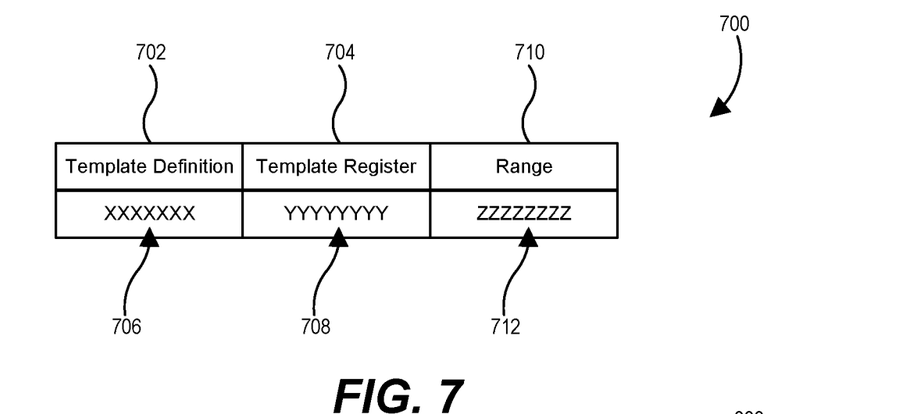
FIG. 7 illustrates an example template control register of a memory controller of the computer system of FIG. 1 according to one or more embodiments.

The memory controller 306 may include a template control register for controlling various aspects of the merge operation, such as the bytes to be used as operands and a set of logical operations to be performed. FIG. 7 shows an example of a template control register 700 according to one or more embodiments. The memory controller 306 may perform the merge operation 600A and/or the merge operation 600B based on one or more features in the template control register 700.

The template control register 700 is a defined region of memory of the memory controller 306 comprising a plurality of data bytes. The template control register 700 includes a template definition 702 and a template register 704. The template definition 702 includes a set of bits 706 indicating how a template is formatted, such as which template bytes are fixed, which template bytes are variable, sizes of template segments, etc. In some embodiments, the template definition 702 may specify information regarding a set of logical operations involved in performing a merge operation, such as the logical operations to be performed and an order of operations. In some embodiments, the information regarding the logical operations to be performed may be included in a separate segment of the template control register 700. In some embodiments, the template definition 702 may include information regarding the data source 302 initiating a write operation, such as the write operation 312. Information regarding the data source 302 may identify a type of the data source 302, an identifier of the data source 302 (e.g., MAC address), and/or a location on a bus of the computer system 100.

The template register 704 includes a set of bytes 708 storing the template provided by the processor core 304. More specifically, the template register 704 stores the template 500A, the template 500B, or any template provided by the processor core 304. The template register 704 is sufficient in size to store a template provided by the processor core 304. The template register 704, in some embodiments, has a size and/or format matching the granularity of the cache memory 106 and memory operations to and/or from the cache memory 106. For instance, template register 704 may be have the same size and/or format as a cache-line of the cache memory 106. The size of the template register 704 may be 64 bytes in length in some implementations. In some embodiments, the template control register 700 includes a range field 706 that specifies different ranges defining segments of the template register 704, such as the first, second, third, and fourth segments 510, 512, 514, and 516 of the template 500B.

Figure 8:
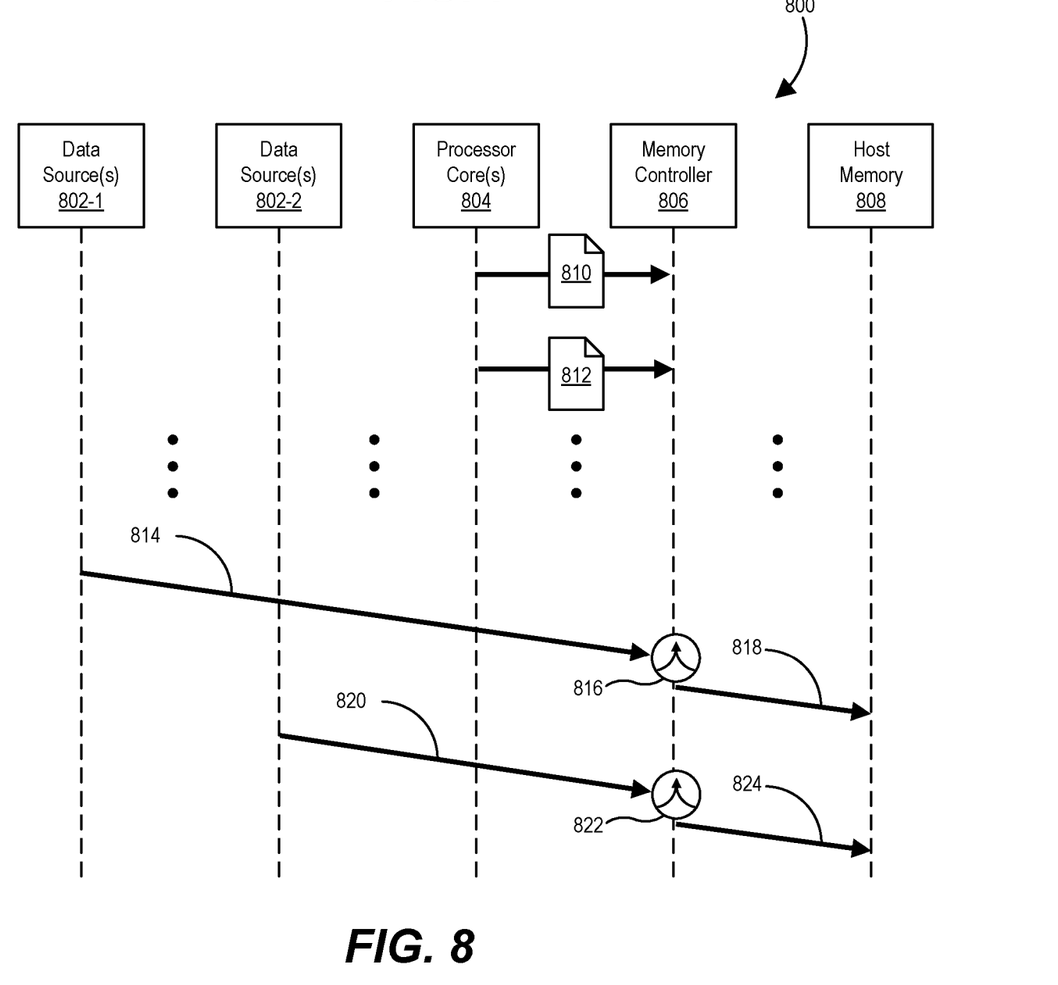
FIG. 8 illustrates a third example data flow diagram in which a series of data transactions are performed in connection with storage of a data payload according to one or more embodiments.

In some embodiments, the memory controller 306 may include a plurality of template registers for storing a plurality of templates provided by a processor core of the computer system 100. FIG. 8 shows an example data flow diagram 800 in which a series of data transactions are performed in connection with storage of a data payload according to one or more embodiments. Various features described with respect to the flow diagram 800 are similar to features described with respect to FIGS. 1 and 3, so further description thereof is omitted for brevity. The flow diagram 800 includes data transactions involving a first data source 802-1, a second data source 802-2, one or more processor cores 804, a memory controller 806, and host memory 808.

In the data flow diagram 800, the processor core 804 may detect provisioning of a first data payload 120-1 (see FIG. 1) from the data source 802-1 to the host memory 808 and provisioning of a second data payload 120-2 (see FIG. 2) from the data source 802-2 to the host memory 808. Detection of the provisioning of the first data payload 120-1 or the second data payload 120-2 may include receiving information from a data source 820 indicating performance of one or more write operations of the first data payload 120-1 or the second data payload 120-2 to the host memory 808.

In connection with detection of the first data payload 120-1, the processor core(s) 804 may provision a first template 810 to the memory controller 806. In connection with detection of the second data payload 120-2, the processor core 804 may provision a second template 812 to the memory controller 806. In some embodiments, the first template 810 has one or more attributes that are different than one or more attributes of the second template 812. For example, the first template 810 may have a different size than the second template 812. The first template 810 may comprise a different number of segments than the second template 812, as another example.

The first template 810 corresponds to the data source 802-1 whereas the second template 812 corresponds to the data source 802-2. The data source 802-1 and the data source 802-2 may differ from each other in one or more aspects. The data source 802-1 may be a different kind of device than the data source 802-2. For example, the data source 802-1 may be an NIC whereas the data source 802-2 may be a video camera device. The data source 802-1 may be a different make/model than the data source 802-2 in some embodiments—for instance, the data source 802-1 may be a video camera connected to the computer system 100 via a USB port whereas the data source 802-2 may be a video camera that is integrated with the computer system 100. Receipt of the first template 810 and the second template 812 by the memory controller 806 may be as a result of the transfer or storage of the first and second payloads 120-1 and 120-2 of FIG. 1.

The data source 802-1 may perform a first write operation 814 to the memory controller 806. The first write operation 814 may include an amount of data smaller in size than the first template 810. The first template 810 may have a size of 64 bytes of data whereas the first write operation 814 may have a size of 8 bytes of data. The memory controller 806 performs a first merge operation 816 in which the data involved in the first write operation 814 and the first template 810 are operands to one or more logical operations. The memory controller 806 performs a write operation 818 involving a result of the first merge operation 816. More specifically, the write operation 818 may include contents corresponding to the write operation 316. A result of the write operation 818 is stored to a memory location of the host memory 808.

The data source 802-2 may perform a second write operation 820 to the memory controller 806 subsequent to the first second write operation 820. The second write operation 820 may include an amount of data smaller in size than the second template 812. The second template 812 may have a size of 64 bytes of data whereas the second write operation 820 may have a size of 8 bytes of data. The memory controller 806 performs a second merge operation 822 in which the data involved in the second write operation 820 and the second template 812 are operands to one or more logical operations, as discussed with respect to FIGS. 6A and 6B. The memory controller 806 performs a write operation 824 involving a result of the second merge operation 822. A result of the write operation 824 is stored to a determined memory location of the host memory 808.

The memory controller 806 is configured, in some embodiments, to perform a plurality of merge operations (e.g., merge operation 816, merge operation 822) from a plurality of data sources 802. In some embodiments, the memory controller 806 is configured to concurrently perform a plurality of merge operations involving write operation data from a plurality of data sources 802. For instance, the memory controller 806 may concurrently perform the merge operation 816 and the merge operation 822. The memory controller 806 may concurrently perform a plurality of merge operations based on write operations serially received over a physical memory interface (e.g., interface 118-1, interface 118-3).

Figure 9:
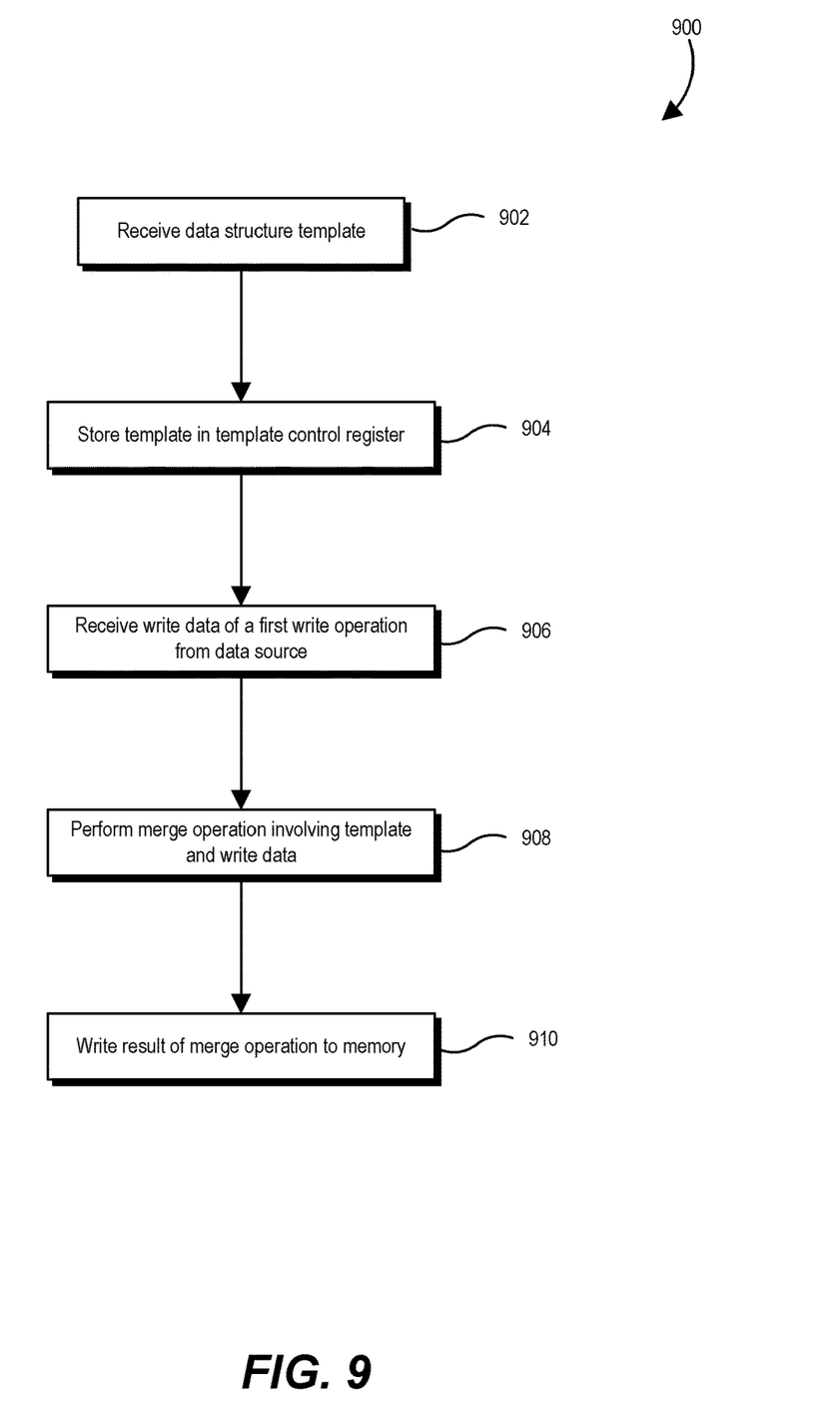
FIG. 9 illustrates a method for performing partial memory updates in a computer system according to one or more embodiments.

FIG. 9 shows a method 900 for performing partial memory updates in a computer system according to one or more embodiments. Some or all of the method 900 may be performed by one or more appropriate entities described herein, such as the computer system 100, the memory controller 112, the memory controller 306, and/or the memory controller 806. The method 900 comprises receiving, at 902, a data structure template, such as the template 310 provided by the processor core 304.

In some embodiments, the data structure template may be received in 902 from a processor core or from a device other than a processing unit, as discussed with respect to FIG. 3 and elsewhere herein. In some embodiments, a plurality of data structure templates may be received in 902. In some embodiments, some of the plurality of data structure templates may correspond to the same data source or type of data source. In some embodiments, a first data structure template may correspond to a first data source whereas a second data structure template may correspond to a second data source. For example, the first data source may be a data source of a first type whereas the second data source may be a data source of a second type different than the first type.

The method 900 may further comprise storing, at 904, the template received in 902 in a template control register, such as the template control register 700 discussed with respect to FIG. 7. The method 900 further comprises receiving, at 906, first write data of a first write operation from a data source. For instance, receiving in 906 may include receiving write data via the write operation 312 discussed with respect to FIG. 3. The write data may be received in 906 in connection with initiation of a write operation by the data source to memory of the computer system 100 (e.g., host memory 116). At 908, the method 900 includes performing a merge operation involving the template received in 902 and the write data received in 906. Performance of the merge operation in 908 may expand a size of the write data (e.g., 8 bytes) to a larger size (e.g., 64 bytes). In some embodiments, performing the merge operation may include performing one or more logical operations using the write data and/or the template received.

The method 900 further comprises writing, at 910, a result of the merge operation to memory of the computer system. The result of the merge operation is, in some embodiments, write data having a larger size than the write data received in 906. In some embodiments, write data generated as a result of performance of the merge operation in 908 may have the same size as the template received in 902. The method 900 may include a number of other operations described herein. The method 900 improves the efficiency of updating a data structure associated with provisioning of a data payload by the data. For instance, the method 900 may reduce bandwidth inflation, reduce latency, and reduce or eliminate read operations between the memory controller and the memory in connection with updating the data structure in the memory.

Example Computer System

Figure 10:
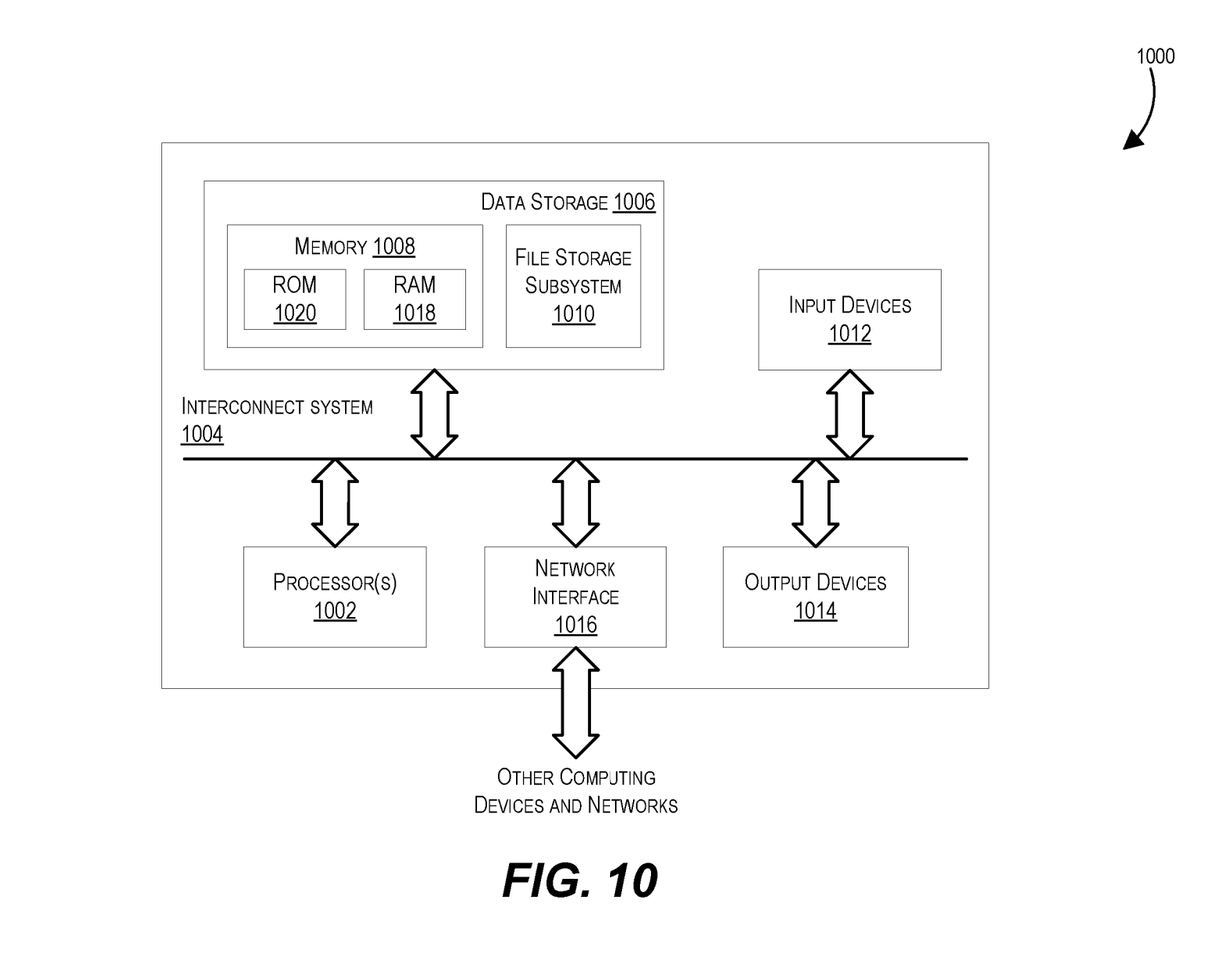
FIG. 10 illustrates a simplified block diagram of an example computer system according to one or more embodiments.

FIG. 10 depicts a simplified block diagram of an example computer system 1000 according to certain embodiments. Computer system 1000 can be used to implement any of the computing devices, systems, or servers described in the foregoing disclosure. As shown in FIG. 10, computer system 1000 includes one or more processors 1002 that communicate with a number of peripheral devices via a interconnect system 1004. These peripheral devices include a data storage 1006 (comprising a memory 1008 and a file storage subsystem 1100), user interface input devices 1012, user interface output devices 1014, and a network interface subsystem 1016.

Interconnect system 1004 can provide a mechanism for letting the various components and subsystems of computer system 1000 communicate with each other as intended. Although interconnect system 1004 is shown schematically as a single bus, alternative embodiments of the bus subsystem can utilize multiple busses.

Network interface subsystem 1016 can serve as an interface for communicating data between computer system 1000 and other computer systems or networks. Embodiments of network interface subsystem 1016 can include, e.g., an Ethernet card, a Wi-Fi and/or cellular adapter, a modem (telephone, satellite, cable, ISDN, etc.), digital subscriber line (DSL) units, and/or the like.

User interface input devices 1012 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1000.

User interface output devices 1014 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1000.

Data storage 1006 includes a memory 1008 and a file/disk storage subsystem 1010. Subsystems 1018 and 1020 represent non-transitory computer-readable storage media that can store program code and/or data that provide the functionality of embodiments of the present disclosure.

Memory 1008 includes a number of memories including a main random access memory (RAM) 1018 for storage of instructions and data during program execution and a read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and many other configurations having more or fewer components than system 1000 are possible.

Further Embodiments

Embodiments of the present disclosure include systems, methods, devices, techniques, and other implementations for partial memory updates in a computer system. Some embodiments include a computer system comprising memory and a first data source communicatively coupled to the memory and configured to provision a first data payload to the memory, the computer system configured to receive, in connection with provisioning of the first data payload to the memory, a first data structure template; receive first write data of a first write operation from a first data source; perform a first merge operation involving the first write data and the first data structure template to obtain a first data structure update; and write the first data structure update to the memory, thereby improving efficiency of updating a first data structure associated with the first data payload. In some embodiments, the computer system includes a memory controller configured to perform the foregoing operations. In some embodiments, the first data structure template is received from one or more processor cores of a processing unit. In some embodiments, the first data structure template is received from a hardware device other than a processor core.

In some embodiments, the first merge operation includes a logical operation using at least the first write data and the first data structure template as operands. In some embodiments, a size of the first write data is different than a size of the first data structure. In some embodiments, a size of the first data structure update matches the size of the first data structure. In some embodiments, the first data structure update includes a first segment and a second segment, the first segment corresponding to a static portion of the first data structure update and the second segment corresponding to a dynamic portion of the first data structure update. In some embodiments, the first data structure update includes a first segment and a second segment, the first segment corresponding to a static portion of the first data structure update and the second segment corresponding to a dynamic portion of the first data structure update.

In some embodiments, the computer system is configured to obtain a second data structure template; receive, in connection with provisioning of the second data payload to the memory, second write data of a second write operation by the first data source; perform a second merge operation involving the second write data and the second data structure template to obtain a second data structure update; and write the second data structure update to the memory, wherein the first data structure template and the second data structure template are associated with the first data source.

In some embodiments, the computer system comprises a second data source communicatively coupled to the memory and configured to provision a second data payload to the memory, wherein the computer system is configured to obtain a second data structure template; receive, in connection with provisioning of the second data payload to the memory, second write data of a second write operation by the second data source; perform a second merge operation involving the second write data and the second data structure template to obtain a second data structure update; and write the second data structure update to the memory.

In some embodiments, the computer system is configured to store the first data structure template in a template control register, wherein the first merge operation is performed based on contents of the template control register. In some embodiments, the first data structure template is received in a message from a peripheral device or via an interconnect system for connecting peripheral devices to a computer system. In some embodiments, the first data structure template is received from one or more processor cores of a processing unit.

Embodiments of the present disclosure include a method comprising receiving a first data structure template; receiving first write data of a first write operation from a first data source, the first write operation initiated in connection with provisioning of a first data payload to memory communicatively coupled with the processing unit; performing a first merge operation involving the first write data and the first data structure template to obtain a first data structure update; and writing the first data structure update to the memory, thereby improving efficiency of updating a first data structure associated with the first data payload. In some embodiments, the first data structure template is received from one or more processor cores of a processing unit.

In some embodiments, the first merge operation includes performing a logical operation using at least the first write data and the first data structure template as operands. In some embodiments, a size of the first write data is smaller than a size of the first data structure and smaller than a size of the first data structure template.

In some embodiments, the first data structure update includes a first segment and a second segment, the first segment corresponding to a static portion of the first data structure update and the second segment corresponding to a dynamic portion of the first data structure update.

In some embodiments, the method comprises obtaining a second data structure template; receiving second write data of a second write operation by a second data source; performing a second merge operation involving the second write data and the second data structure template to obtain a second data structure update; and writing the second data structure update to the memory.

In some embodiments, the first data structure template is received from one or more processor cores of a processing unit.

In some embodiments, the method comprises storing the first data structure template in a template control register, wherein the first merge operation is performed based on contents of the template control register.

Embodiments of the present disclosure include a memory controller, comprising a template control register, the memory controller configured to receive a data structure template from a processor core; store the data structure template in the template control register; receive first write data of a first write operation from a data source; perform a first merge operation that expands a first size of the first write data to a second size of the data structure template; and write a first result of the first merge operation to memory, thereby improving efficiency of updating a data structure associated with provisioning of a data payload by the data.

In some embodiments, the memory controller is configured to receive the first data structure template from a processor core of a processing unit. In some embodiments, the memory controller is configured to receive the first data structure in a message from a peripheral device or via an interconnect system for connecting peripheral devices to a computer system. In some embodiments, a size of the result matches the second size.

In some embodiments, the memory controller is configured to receive second write data of a second write operation from the data source, the second write data having the first size; perform a second merge operation that expands the first size of the second write data to the second size of the data structure template; and write a second result of the second merge operation to the memory. In some embodiments, the memory controller is configured to concurrently perform the first merge operation and the second merge operation. In some embodiments, the memory controller is configured to receive the second data structure template from a processor core of a processing unit. In some embodiments, the memory controller is configured to receive the second data structure in a message from a peripheral device or via an interconnect system for connecting peripheral devices to a computer system.

In some embodiments, the first merge operation includes a logical operation using at least the first write data and the data structure template as operands. In some embodiments, the template control register includes a first portion for storing the data structure template and includes a second portion indicating a format of the data structure template.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

What is claimed is:

1. A computer system comprising:
   memory;

a first data source communicatively coupled to the memory and configured to provision a first data payload to the memory; and a memory controller coupled to the memory and configured to:

receive, in connection with provisioning of the first data payload to the memory and without accessing the memory, a first data structure template corresponding to a first data structure stored in the memory and associated with the first data payload;

receive first write data of a first write operation from the first data source;

without accessing the memory, perform a first merge operation involving the first write data and the first data structure template to obtain a first data structure update; and update the first data structure by writing the first data structure update to the memory.

2. The computer system of claim 1, wherein the first merge operation includes a logical operation using at least the first write data and the first data structure template as operands.

3. The computer system of claim 1, wherein the first data structure template has a size matching the size of the first data structure being updated in memory, the first data structure stores the first data payload, and the first write data is smaller than the first data payload.

4. The computer system of claim 1, wherein the first data structure update includes a first segment and a second segment, the first segment corresponding to a static portion of the first data structure update and the second segment corresponding to a dynamic portion of the first data structure update.

5. The computer system of claim 1, the computer system configured to:

obtain a second data structure template;

receive, in connection with provisioning of a second data payload to the memory, second write data of a second write operation by the first data source;

perform a second merge operation involving the second write data and the second data structure template to obtain a second data structure update; and update the second data payload by writing the second data structure update to the memory.

6. The computer system of claim 1, further comprising:

a second data source communicatively coupled to the memory and configured to provision a second data payload to the memory, wherein the computer system is configured to:

obtain a second data structure template;

receive, in connection with provisioning of the second data payload to the memory, second write data of a second write operation by the second data source;

perform a second merge operation involving the second write data and the second data structure template to obtain a second data structure update; and write the second data structure update to the memory.

7. The computer system of claim 1, wherein the memory controller:

stores the first data structure template in a template control register, and wherein the first merge operation is performed based on contents of the template control register.

8. The computer system of claim 1, wherein the memory controller receives the first data structure template during an update to software or firmware.

9. The computer system of claim 1, wherein the first data structure template includes a first set of bytes set to fixed values and a second set of bytes that are updated each time the first data structure template is accessed and used to facilitate an update to the first data structure.

10. A method comprising:

obtaining a first data structure template corresponding to a first data structure stored in a memory being updated by a first write operation, the first data structure template being obtained without access to the memory;

receiving first write data of the first write operation from a first data source;

without accessing the memory, performing a first merge operation involving the first write data and the first data structure template to obtain a first data structure update; and updating the first data structure by writing the first data structure update to the memory.

11. The method of claim 10, wherein the first merge operation includes performing a logical operation using at least the first write data and the first data structure template as operands.

12. The method of claim 10, wherein the first data structure template has a size matching the size of the first data structure being updated in memory and the first write data is smaller than the first data structure.

13. The method of claim 10, wherein the first data structure update includes a first segment and a second segment, the first segment corresponding to a static portion of the first data structure update and the second segment corresponding to a dynamic portion of the first data structure update.

14. The method of claim 10, comprising:

obtaining a second data structure template;

receiving second write data of a second write operation by a second data source;

performing a second merge operation involving the second write data and the second data structure template to obtain a second data structure update; and writing the second data structure update to the memory.

15. The method of claim 10, wherein the first data structure template is received from one or more processor cores of a processing unit.

16. The method of claim 10, comprising:

storing the first data structure template in a template control register, wherein the first merge operation is performed based on contents of the template control register.

17. A system comprising:

a memory controller configured to:

receive first write data from a data source, the first write data specifying an update to a data structure stored in a memory;

without accessing the memory, receive and store a first data structure template in a template control register;

without accessing the memory, perform a first merge operation that expands a first size of the first write data to a second size of the first data structure template; and update the data structure in the memory by writing a first result of the first merge operation to the memory.

18. The memory controller of claim 17, wherein the second size of first data structure template matches a third size of the data structure that is being updated in the memory.

19. The memory controller of claim 17, the memory controller configured to:

receive second write data of a second write operation from the data source, the second write data having the first size;

perform a second merge operation that expands the first size of the second write data to the second size of the first data structure template; and write a second result of the second merge operation to the memory.

20. The memory controller of claim 19, wherein the memory controller is configured to concurrently perform the first merge operation and the second merge operation.

21. The memory controller of claim 17, wherein the first merge operation includes a logical operation using at least the first write data and the first data structure template as operands.

22. The memory controller of claim 17, wherein the template control register includes a first portion for storing the first data structure template and includes a second portion indicating a format of the first data structure template.

* * * * *